(No Model.)
C. P. STEINMETZ.
SYSTEM OF ELECTRICAL DISTRIBUTION.
No. 539,450. Patented May 21, 1895.
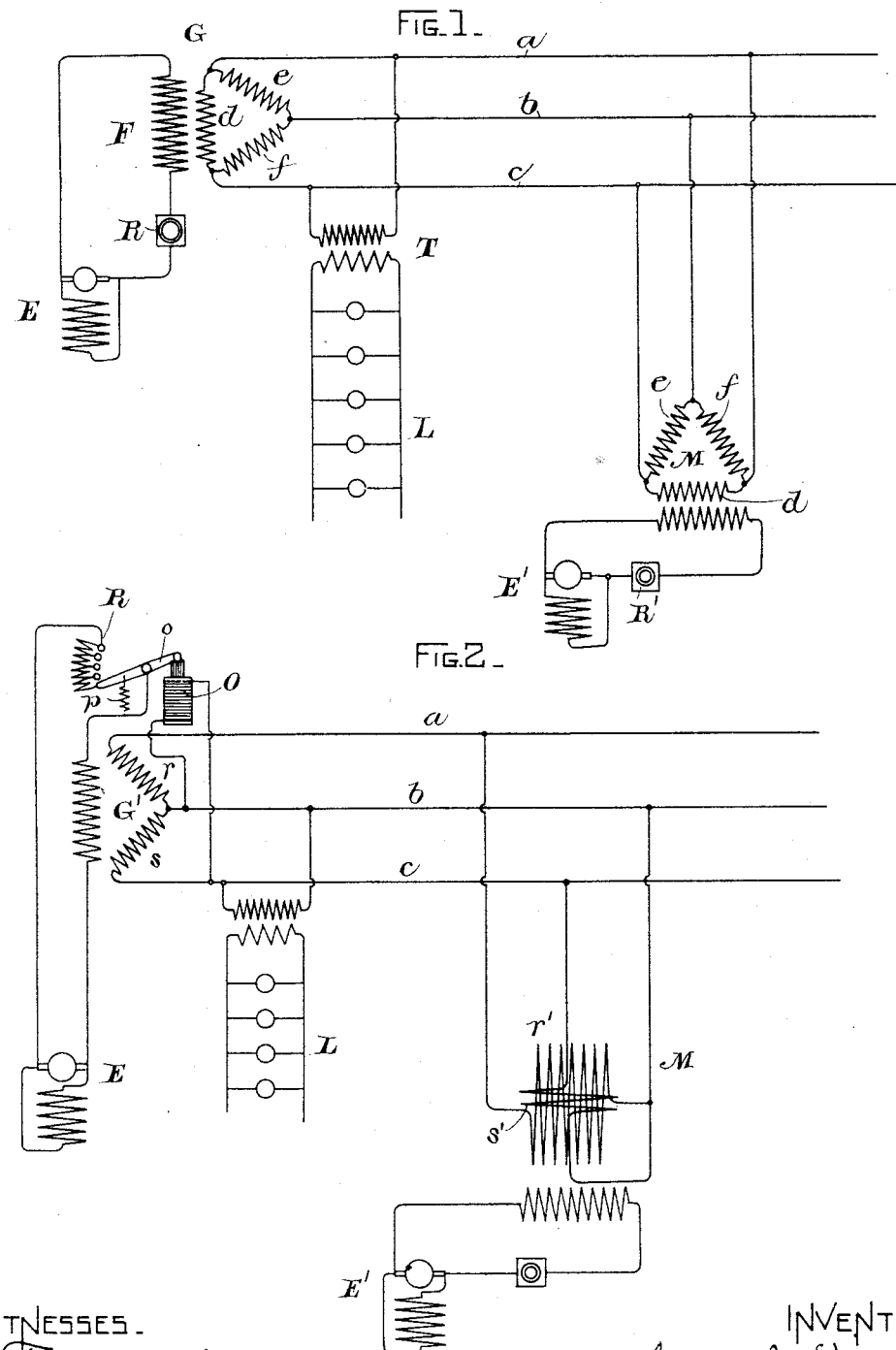
WITNESSES.
A. F. Macdonald.
B. B. Hull.
INVENTOR.
Charles P. Steinmetz
By R. Blodgett
Atty.

UNITED STATES PATENT OFFICE.

CHARLES P. STEINMETZ, OF SCHENECTADY, NEW YORK, ASSIGNOR, BY MESNE ASSIGNMENTS, TO THE GENERAL ELECTRIC COMPANY, OF SAME PLACE.

SYSTEM OF ELECTRICAL DISTRIBUTION.

SPECIFICATION forming part of Letters Patent No. 539,450, dated May 21, 1895.

Application filed December 20, 1894. Serial No. 532,446. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

The present invention relates to systems of distribution of alternating polyphase currents, and especially to those in which lights and motors are to be supplied with current from the same generators and inter-connected distributing mains.

The system has been familiarly styled a "polycyclic" system of distribution, and I will refer to it as such herein.

The object of the invention is to be able to supply lamps and motors from the same source without the difficulties growing out of an unbalanced system, which are recognized by electrical engineers as the art exists to-day. With single-phase alternators the question of balance is eliminated, since all the translating devices are connected in the same circuit. In this regard the single-phase machine has an advantage over the polyphase machine. The monocyclic system, for which application for patent has previously been made, and which is now well understood in the art, also practically eliminates the question of balance, since this is substantially a single-phase system, and operates as a single-phase system, with the exception of the transfer of energy over the supplementary or teaser main, as is required from time to time. In some cases, however, it is preferable to distribute polyphase currents, since the line losses are reduced and the practical output of the generators increased. In a single-phase generator the practical output is limited by heating of the machine. In polyphase generators the output of the machine as fixed by the heating limit is considerably higher, but this advantage of polyphase generators disappears if lighting as well as the distribution of power is demanded of the same system, for the following reason: The permissible output of polyphase generators is not limited by heating, but by the question of balance. At large outputs a three-phase generator becomes very sensitive for balance, that is, a small difference in the load of the different branches causes a noticeable variation of the voltage, so that wherever lights are to be operated from a polyphase generator, the generator has to be rated lower than would be permissible by the heating limit alone. This difficulty is specially noticeable in alternating current distribution systems for power with incidental lighting, as for driving motors in mills, factories, &c., and the present invention has been devised for such installations especially. Its purpose is to secure the advantages of a polyphase system, while avoiding the difficulties heretofore due to a lack of balance.

The polycyclic system consists of a polyphase generator whose circuit is divided into a single-phase lighting circuit, and a motor circuit. The motors preferably are of the single-phase or monocyclic type, which derive substantially all their operating energy from a single circuit. Hence the system generally stated, consists of a lighting circuit in one branch of the system, and a motor circuit in the other branch of the system, but the balance and proper distribution of load are maintained by transferring energy from one branch to the other over a balance wire in which the electromotive forces determining the flow of current are, first, the impressed electromotive force in the lighting mains, and, second, the counter electromotive force generated in a supplementary coil on the motors, so that these electromotive forces are balanced against one another in much the same way as are the electromotive forces on the neutral main of the monocyclic system. The lamps act as a teaser circuit for the motors, in that they serve to determine the voltage on the lighting branch and so influence the flow of current through the supplementary motor coils. The system operates, therefore, in somewhat the same manner as the monocyclic system, but differs in this: In the monocyclic system the lighting circuit and motor circuit are operated from what is substantially a single-phase machine and receive currents of the same phase. In the polycyclic system the lighting and motor circuits are of different phases, and operated from the different branches of a polyphase generator.

To explain the invention further, I will show how it may be operated with a quarter-phase generator. One of the two branches of the generator operates the lighting circuit in which the voltage is maintained constant by regulating the generator in one of the usual ways, so that no matter what changes take place in the circuit, the lights operate at constant voltage. The other circuit of the quarter-phase generator supplies monocyclic or single-phase motors and the outside wire of the single-phase lighting system forms the teaser wire or balance wire for the motors. Thus, by this teaser wire the motors will equalize among themselves, as will also the loads upon the motor and lighting circuits. If the lighting and motor circuits are equally loaded, the motors will all operate as single-phase machines, and no current will flow over the teaser wire between the different branches. If less lights are operated than motors, the voltage on the lighting circuit will increase, or rather, the voltage at the motor teaser circuit decreases below that of the lighting circuit, and consequently, energy current will flow from the lighting circuit into the motor circuit, or, in other words, a part of the motor load will be carried by the lighting circuit. Again, if more lights are operated than motors the voltage of the lighting circuit will fall below that of the motor teaser circuit, and energy current will be returned from the motor into the lighting circuit, that is, the motors are operated partly as phase-changers and assist the lighting circuit.

The operation will be essentially the same with a three-phase generator operating lights of constant potential from one of its branches, while the motors are connected between all three mains, the generator and system, being designed to allow interchange between the different phases.

A prominent feature of the polycyclic system is that it is a polyphase system, but the lighting part is single-phase and cannot be unbalanced. In a regular polyphase system load has to be divided evenly over the different branches, and polyphase generators are built of very low armature reaction and low self induction so as to make the tendency toward unbalancing negligible at moderate inequality of load. In the polycyclic system an equal distribution of load is maintained on all the circuits of the generator independent of the distribution of translating devices by interchange of energy from one branch to another over the teaser wire. Therefore, the generator will preferably have a comparatively large self induction and armature reaction, so as to allow an easy interchange and automatic distribution of the load between the circuits.

In the accompanying drawings, Figure 1 shows in diagram a three-phase distribution system, or, rather, a three-phase system as modified by the present invention; and Fig. 2 shows, similarly, a polyphase system.

In Fig. 1 a main generator G has a field-winding F supplied with current by a direct current exciter E, which is shown as shunt-wound and as regulated by a resistance R, in order to maintain the desired voltage in the alternator, as will be understood. The armature of the generator G has a three-phase winding shown as comprising three coils connected in delta in a manner well-known in the art. A lighting circuit L is shown connected across the mains $a$ $c$ through a tension-reducing transformer T. In practice there will be any desired number of lighting circuits derived from these mains. A three-phase motor M wound in a manner resembling the generator, has its armature terminals connected to the mains $a$ $b$ $c$, as indicated. In practice, transformers will generally be used in the motor circuits, but these are not shown, since they constitute no part of the invention. The motors may be either of the synchronous or induction type, the one represented in the drawings being assumed to be a synchronous motor, whose field is excited with current from the machine E', and regulated by a resistance R'.

The novelty of this system, as thus far described, consists in massing the lights or other purely single-phase translating devices requiring constant potential on one branch of the system, and transferring energy between this branch and the other branches through one of the motor coils. Assume for example that in a given installation the lamp load is to be one-third of the motor load, then the $d$ coils of the motor and generator or the resistance and self induction of the connecting mains will ordinarily be such that at normal load, substantially no energy current flows through the coil $d$ of the motor between the mains $a$ $c$. The lamps then form the normal load on this branch, and receive currents of one phase, while the motors receive power currents of two phases between the other branches of the system $b$ $c$ and $a$ $b$. There will then be substantially a balance between the counter electromotive force generated in the circuit of the $d$ motor coil and the impressed electromotive force in the lighting circuit. Whenever this relation becomes disturbed, as for example, by changing the lamp load and so changing the voltage in the lighting circuit, the balance is restored by current flowing through the $d$ coil of the motor and which may help out either the lamps or motors, as conditions require. The $e$ and $f$ coils of the motor have a less number of turns than the corresponding coils of the generator, so as to normally receive power currents.

In Fig. 2 a quarter-phase generator G' is illustrated, whose field is excited as in Fig. 1 by a direct current machine E. The armature of the generator has coils $r$ $s$ disposed ninety degrees in the field of force and connected to the circuit mains $a$ $b$ $c$ in the manner indicated, the main $b$ being a common return for the two branches of the system. The lighting circuit L is coupled across the mains $b$ $c$ and motors or other motive apparatus such as rotary transformers or phase-controllers have coils connected across the different branches of the system. As shown at M, which represents a synchronous motor, there is a main coil $r'$ connected across branch $a$ $b$ of the distributing system, and a supplementary coil $s'$ connected across the lighting mains $b$ $c$. The field of the motor is in circuit with a direct current machine E'. This motor operates after the manner of a monocyclic motor. Under ordinary conditions the principal part of its operating current will be derived only from the motor branch of the system, while the current supplied to the lamps is derived from the lighting mains. The system is thus divided into lighting and power work, and the balance is maintained by transferring energy from one branch to the other through the balance wire and supplementary motor coil $s'$. The proportions of the machines or other means used to effect the distribution of current, will ordinarily depend upon the conditions in any given installation. If the lamp and motor load are to be substantially equal, then the system will be so proportioned that under normal conditions the motor M acts as a single phase motor with practically no current flow in the coil $s'$. If the motor load is to preponderate, the proportions may be made such that power current will always flow to the motors under normal conditions through the coil $s'$, thereby in effect, putting so much of the motor load on the lighting branch as maintains a balance under normal conditions. If the lighting load preponderates, the system may be so designed that a part of the energy for operating the lamps is normally derived from the motor branch and is supplied to the motor circuit through the coils $s'$.

Constant potential may be preserved in the lighting circuit by regulating the generator G' in any suitable manner. In order to render the regulation automatic I have shown a constant potential magnet O connected across the mains $b$ $c$, whose armature or core controls the resistance in the exciter circuit. For this purpose, a rheostat R is shown in the main circuit of the exciter, and the solenoid of the magnet is connected to a contact arm $o$, which is thrown in one direction when the voltage is too high by the attraction of the solenoid, and in the other direction by a spring $p$. In all the well-known forms of automatic control, regulating mechanism may be substituted for that just described.

What I claim as new, and desire to secure by Letters Patent of the United States, is—

1. The method of electrical distribution, which consists in supplying from a polyphase generator, or supply source, alternating currents of a given phase relation for operating lights coupled in one of the branches into which the system is divided, and alternating currents of different phase relation for operating motors connected to one or more other branches of the system, and transferring energy between the lighting and motor branches through a balance wire to preserve the proper distribution of load, as set forth.

2. The method of electrical distribution, which consists in dividing the load on the different branches of the system between lamps and motors, the lamps forming the principal load on one branch, and the motors the principal load on the other, and transferring energy between the motor and lighting branches through a coil on the motors connected across the lighting branch, and generating an electromotive force counter to the impressed electromotive force on the lighting branch, as set forth.

3. The method of electrical distribution, which consists in massing the lamps, or like purely single-phase translating devices, on one branch of a polyphase system, deriving the principal energy for operating motors or motive apparatus from the remaining branch or branches of the system, and transferring energy between the lighting and motor branches by a balance wire, in which the direction and amount of energy so transferred, is dependent upon the relation between the impressed electromotive force on the lighting circuit and the counter electromotive force generated in a motor coil connected across the lighting mains, as set forth.

4. The herein described system of electrical distribution, comprising a polyphase generator and distributing mains, a lighting circuit or circuits, so connected as to form the principal load on one branch of the system, a motor or motors having coils connected across one or more other branches of the system, and forming the principal load thereon, and an out-of-phase motor coil connected across the lighting branch, through which energy is transferred between the motor and lighting branches, for the purpose set forth.

5. An electrical distribution system, comprising in combination a lighting circuit fed with alternating currents of given phase relation from one branch of a polyphase circuit, and motors of the monocyclic type provided with a main coil receiving power current from a second branch of the distributing system, and a supplementary or teaser coil connected across the mains of the lighting branch whereby the main operating energy for the lights and motors respectively, is derived from different branches of the system, but the transfer of energy from one to the other is rendered possible, in the manner described.

In witness whereof I have hereunto set my hand this 17th day of December, 1894.

CHARLES P. STEINMETZ.

Witnesses:
B. B. HULL,
A. F. MACDONALD.